Figure 1:
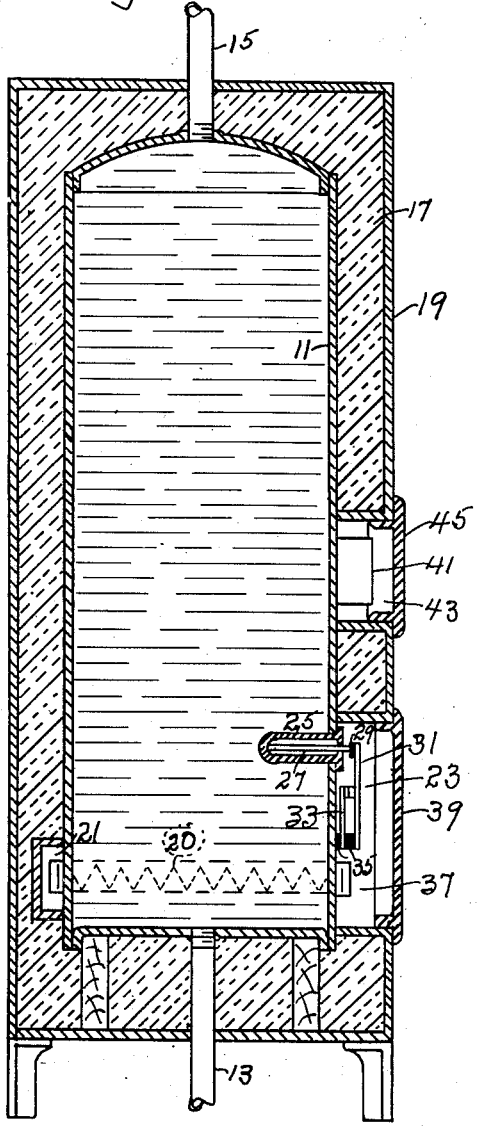

July 3, 1945.  H. M. BIEBEL  2,379,675

WATER HEATER CONTROL SYSTEM

Filed Jan. 31, 1944

INVENTOR.
HERMAN M BIEBEL
BY
H M Biebel
ATTORNEY

Patented July 3, 1945

2,379,675

UNITED STATES PATENT OFFICE 2,379,675

WATER HEATER CONTROL SYSTEM

Herman M. Biebel, Elgin, Ill., assignor to McGraw Electric Company, Elgin, Ill., a corporation of Delaware Application January 31, 1944, Serial No. 520,517

7 Claims. (Cl. 219—39)

My invention relates to electric heating and particularly to control systems for hot water heaters.

An object of my invention is to provide a control system for the electric heater of a hot water tank that shall embody a single switch for the heater circuit, which switch is controlled by a pair of thermally actuable switches subject to tank water temperature.

Another object of my invention is to provide a control system for a single heater control switch that shall cause closure of said switch either with a time delay period or immediately in accordance with the amount of cold water in the tank.

Other objects of my invention will either be apparent from a description of one form of system embodying my invention or will be pointed out in the course of such description and set forth in the appended claims.

Figure 2:
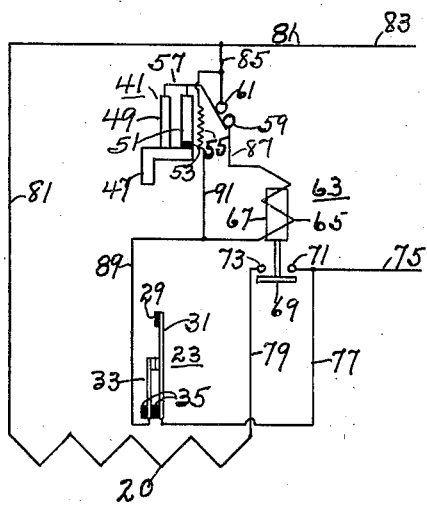

In the drawing,

Fig. 1 is a vertical sectional view through a hot water tank with which is associated a heater control system embodying my invention, and, Fig. 2 is a diagram of connections of the system embodying my invention.

A hot water tank 11 is provided with a lower cold water inlet pipe 13, an upper hot water outlet pipe 15 and may be surrounded by heat-insulating material 17, which latter is held in proper operative position around the tank 11 by an outer casing 19.

I provide preferably but not necessarily, a single electric heater 20 located near the lower end of tank 11 and, as is now well known in the art, I may provide a tunnel member 21 to receive the clamp-on heater 20, all in a manner now well known in the art.

I provide a first lower terminal control switch 23 which includes a tubular member 25 having a closed inner end and having its open outer end secured in water tight condition in an opening in tank 11 just above the heater 20. An expansion rod 27 is fitted into the tubular member 25 and has its outer end adapted to engage with and be disengaged from a lug 29 on the free end of a resilient contact arm 31. This contact arm is normally adapted to be in engagement with a substantially rigid contact arm 33, the two contact arms being spaced apart and supported on the tank 11 as by blocks 35 of electric insulating material. The design, construction and adjustment of this thermal switch is such that when the tube 25 is subject to cold water having a temperature on the order of 70°, expansion rod 27 is out of engagement with lug 29, while when tube 25 is subject to hot water having a temperature on the order of 150° F. or over, expansion rod 27 will have an increased length sufficient to cause disengagement of contact arm 31 from contact arm 33. While I have shown a specific embodiment of a thermal switch, I do not desire to be limited thereto since any other form of thermal switch now well known and used in the art and effective for the same purpose, may be substituted in place thereof. Thermal switch 23 may be positioned in an opening 37 in the heat insulating material and the outer casing thereof, which opening may be provided with a cover 39.

I provide a thermal retarder control switch unit 41 which is located in an opening 43 in the heat insulating material 17 and in the outer casing 19 which opening is preferably located at about the mid-height of the tank 11 and which may be closed by a cover 45. This thermal retarder switch unit is disclosed and claimed in copending application S. N. 511,387, filed November 22, 1943, by C. M. Osterheld and assigned to the same assignee as is the present application. Briefly the general design of such thermal retarder unit includes a support 47 of heat-conducting material secured in heat receiving relation on tank 11 and having mounted thereon a first high expansion rod 49 which is adapted to be subject to the temperature of the water in the tank through support 47. I provide further a second low expansion rod 51 which is supported by or on a member 53 of heat-insulating material and is provided with a heating coil 55 operatively associated therewith. The two expansion rods 49 and 51 are adapted to support a switch member 57, here shown as of substantially L-shape, which switch member is adapted to engage with two contact terminals 59 and 61 or to be disengaged therefrom in accordance with the relative temperature conditions of the two rods 49 and 51. Thus when the thermal retarder unit is subject to cold water in tank 11 so that the temperature of the first high expansion rod 49 is on the order of 70° F., and the heating coil 55 has been energized for only a short period of time, switch contact member 57 is adapted to be in engagement with contact terminals 59 and 61, or in other words the thermal retarder switch is in circuit closing position. If high expansion rod 49 is subject to the temperature of hot water, that is water heated to about 150° F. or slightly over, while low expansion rod 51 is at ordinary room temperature, high expansion rod 49 will have an increased length such that switch member 57 will have been moved out of engagement with contact terminals 59 and 61, so that the thermal retarder switch will be in open circuit position. If now heating coil 55 has been energized for a length of time on the order of say five hours, and its temperature has been raised to a temperature of 300° F. or over, the length of the low expansion rod 51 will be substantially the same as that of the high expansion rod 49, the temperature of which is on the order of 150° F., with the result that switch contact 57 will again be in engagement with contact terminals 59 and 61 so that the terminal retarder switch is again in closed position. Preferably, the low expansion rod 51 is made of such material that its temperature must be raised to a value on the order of say 300° F. or over, before the length of rod 51 will be substantially the same as that of the first rod 49 when it has been heated to a temperature on the order of 150° F.

I provide also an electromagnetic switch 63, comprising a coil 65 adapted to be traversed by a current and to energize a magnetic armature core 67. The armature core has connected therewith a contact bridging member 69, which latter is adapted to be moved into engagement with fixed contact members 71 and 73 when the coil 65 is traversed by an electric current. The first fixed contact member 71 is adapted to be connected to a supply circuit conductor 75 and also, by a conductor 77 with the resilient contact arm 31 of thermal control switch 23. The second fixed contact terminal 73 is connected by a conductor 79 to one terminal of the electric heater 20, the other terminal of which is connected by a conductor 81 with a second supply circuit conductor 83. Conductor 81 is connected by a conductor 85 with one terminal of heating coil 55 and with contact terminal 61. The second contact terminal 59 is connected by a conductor 87 with one terminal of coil 65, the other terminal of which is connected by a conductor 89 with the substantially rigid contact arm 33.

Let it now be assumed that the control system is connected to the energized supply circuit conductors 75 and 83 and that the tank is filled entirely with cold water. This will cause movement of contact arm 31 into engagement with contact arm 33 and will also cause movement of switch member 57 into engagement with contact terminals 59 and 61, because of the decreased length of the high expansion rod 49. The movement of the lower thermal switch 23 and of the thermal retarder switch 41 to closed positions causes a current to flow through coil 65 of the electromagnetic switch 63, which circuit may be traced as follows: from supply circuit conductor 75, conductor 77, contact arms 31 and 33, conductor 89, coil 65, conductor 87, contact terminals 59 and 61, conductors 85 and 81 to the second supply circuit conductor 83. This causes energization of the core 67 with resultant upward movement thereof and engagement of contact bridging member 69 with the fixed terminals 71 and 73. This closure of the electromagnetic switch 63 causes an energizing current to flow through heater 20, which circuit may be traced as follows: from the first supply circuit conductor 75 through terminals 71 and 73 and bridging member 69, through conductor 79, heater 20, and through conductor 81 to the second supply circuit conductor 83. This results in energization of heater 20 with attendant heating of the water in tank 11. Closure of the lower thermal switch 23 also causes a current to flow through heating coil 55, the circuit of which may be traced as follows: from the first supply circuit conductor 75, through conductor 77, contact arms 31 and 33, through conductors 89 and 91 to heating coil 55 and through conductor 85 to the second supply circuit conductor 83. This energization of coil 55 will result in rise of temperature of the second expansion rod 51 and at the end of a length of time on the order of five hours, this temperature will be on the order of 300° F.

When starting to heat a tank full of cold water, as by a single heater of the clamp-on type, the temperature of the water in the tank will be substantially uniform from top to bottom of the tank, the temperature increasing with the length of time of energization of the heater. The thermal retarder unit will therefore have its operating temperature to which it is subjected increased more or less uniformly with increase in the length of time of energization of heater 20. Therefore the two expansion rods 49 and 51 will have their temperatures increased so that the electromagnetic switch 63 will remain in closed position until caused to open by reason of the disengagement of contact arm 31 from contact arm 33 when substantially all of the water in the tank is hot.

Let it now be assumed that substantially all of the water in the tank was hot during the early morning hours but that only a relatively small amount of hot water was withdrawn from the tank, the quantity withdrawn being such that only the lower thermal switch 23 was subject to cold water replacing the hot water withdrawn from the tank. In this case the hereinbefore described energizing circuit through heating coil 55 will be closed. Because of the subjection of the thermal retarder switch to hot water, it will be in open position. Therefore energization of heating coil 55 must continue for a length of time on the order of five hours before the low expansion rod will have had its length increased sufficiently to cause reclosure of the switch controlled by the two rods 49 and 51. When the temperature of the low expansion rod 51 has reached a value on the order of 300° F., the switch member 57 will again be moved into engagement with contact terminals 59 and 61 with the attendant result of energization of coil 65, closure of the switch 63 with energization of heater 20. This energization of heater 20 with heating up of the cold water then in the tank will continue until substantially all of the water in the tank is hot when contact arm 31 will be disengaged from contact arm 33 with resultant deenergization of coil 56 and opening of the electromagnetic switch 63.

Let it now be assumed that an amount of hot water was withdrawn from the tank sufficient to cause entry of enough cold water into the tank so that the thermal retarder switch unit was also subject to cold water. This will result in quick reduction in length of the high expansion rod 49 with immediate resulting closure of the switch. This will immediately energize the coil 65 and cause closure of the electromagnetic switch 63 with attendant flow of current through heater 20, which flow of current will continue until the lower thermal switch 23 is again opened as hereinbefore described.

The control system embodying my invention therefore provides a system for controlling the electric heater, which system is selectively effective to cause energization of the heater either with a predetermined time period of delay or immediately, in accordance with the amount of cold water in the tank.

Various modifications may be made in the system embodying my invention without departing from the spirit and scope thereof, and all such modifications coming clearly within the scope of the appended claims are to be considered a part of my invention.

I claim as my invention:

1. A heater control system for a hot water tank having an electric heater, comprising an electromagnetic heater control switch having a coil, a thermally-actuable switch subject to tank water temperature at the lower end portion of the tank and a thermal retarder switch unit comprising a pair of dissimilarly thermally-responsive elements, subject to tank water temperature intermediate the ends of the tank, said thermally-actuable switch and said thermal retarder switch being jointly effective to control said electromagnetic switch and cause the same to move immediately into heater energizing position upon filling the tank with cold water.

2. A heater control system for a hot water tank having an electric heater, comprising an electromagnetic heater control switch having a coil, a thermally-actuable switch subject to tank water temperature at the lower end portion of the tank and a thermal retarder switch unit comprising a pair of dissimilarly thermally-responsive elements, subject to tank water temperature intermediate the ends of the tank, said thermally-actuable switch and said thermal retarder switch being connected in series circuit with each other and with the coil of said electromagnetic switch and being effective to cause energization of said coil and closure of said electromagnetic switch immediately in case enough hot water is withdrawn from the tank to cause the thermal retarder switch to be subject to cold water.

3. A heater control system for a hot water tank having an electric heater, comprising an electromagnetic heater control switch having a coil, a thermally-actuable switch subject to tank water temperature at the lower end portion of the tank and a thermal retarder switch unit comprising a pair of dissimilarly thermally-responsive elements, subject to tank water temperature intermediate the ends of the tank, said thermally-actuable switch and said thermal retarder switch being connected in series circuit with each other and with the coil of said electromagnetic switch and being effective to cause energization of said coil and closure of said electromagnetic switch with a predetermined time period of delay in case enough hot water is withdrawn from the tank to cause only the thermally-actuable switch to be subject to cold water.

4. A heater control system for a hot water tank having an electric heater, comprising an electromagnetic heater control switch having a coil, a thermally-actuable switch subject to tank water temperature at the lower end portion of the tank and a thermal retarder switch unit comprising a pair of dissimilarly thermally-responsive elements, subject to tank water temperature intermediate the ends of the tank, said thermally-actuable switch and said thermal retarder switch being connected in series circuit with each other and with the coil of said electromagnetic switch and being effective to cause energization of said coil and closure of said electromagnetic switch immediately in case enough hot water is withdrawn from the tank to cause the thermal retarder switch to be subject to cold water, said thermally-actuable switch being effective to interrupt the energization of said coil and to cause opening of said electromagnetic switch when substantially all of the water in the tank is hot.

5. A heater control system for a hot water tank having an electric heater, comprising an electromagnetic heater control switch having a coil, a thermally-actuable switch subject to tank water temperature at the lower end portion of the tank and adapted to be in closed position when subject to cold water and a thermal retarder switch unit comprising a pair of dissimilarly thermally-responsive elements, subject to tank water temperature intermediate the ends of the tank, said thermally-actuable and said thermal retarder switch being connected in series circuit with each other and with said coil, said thermal retarder switch unit being effective to prevent energization of said coil and closure of said electromagnetic switch for a predetermined period of time in case of withdrawal of enough hot water from the tank to cause entry of only enough cold water into the tank to subject said thermally-actuable switch to cold water.

6. A heater control system for a hot water tank having an electric motor, comprising an electromagnetic heater control switch having a coil, a thermally-actuable switch subject to tank water temperature at the lower end portion of the tank and adapted to be in closed position when subject to cold water and a thermal retarder switch unit, comprising a pair of dissimilarly thermally-responsive elements, subject to tank water temperature intermediate the ends of the tank, said thermally-actuable switch and said thermal retarder switch being connected in series circuit with each other and with said coil, said thermal retarder switch being effective to prevent energization of said coil and closure of said electromagnetic switch for a predetermined period of time in case of withdrawal of enough hot water from the tank to cause entry of only enough cold water into the tank to subject said thermally-actuable switch to cold water and being effective to cause immediate energization of said coil and closure of said electromagnetic switch in case of withdrawal of enough hot water from the tank to cause entry of enough cold water into the tank to subject both the thermally-actuable switch and the thermal retarder switch to cold water.

7. A heater control system for a hot water tank having an electric heater, comprising an electromagnetic heater control switch having a coil, a thermally-actuable switch subject to tank water temperature at the lower end of the tank and adapted to be in closed position when subject to cold water and a thermal retarder switch unit comprising a pair of dissimilarly thermally-responsive elements, subject to tank water temperature intermediate the ends of the tank, said thermally-actuable switch and said thermal retarder switch being connected in series circuit with each other and with said coil, said thermal retarder switch being effective to prevent energization of said coil and closure of electromagnetic switch for a predetermined period of time in case of withdrawal of enough hot water from the tank to cause entry of only enough cold water into the tank to subject said thermally-actuable switch to cold water and said thermally-actuable switch being effective to deenergize said coil when substantially all of the water in the tank is hot.

HERMAN M. BIEBEL.